NORRIS & KNIGHT.
Car Truck.
No. 2,951.
Patented Feb. 10, 1843.
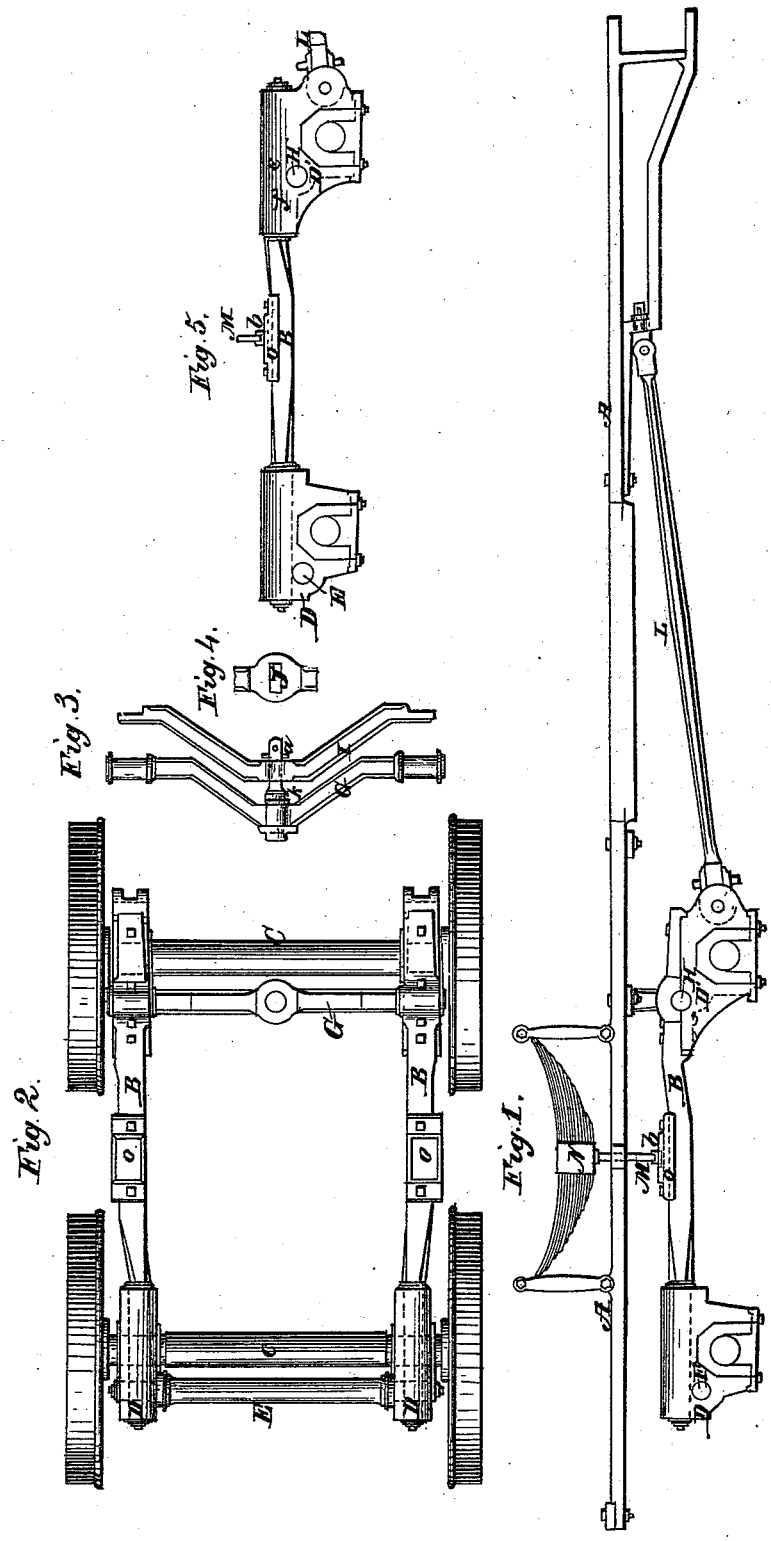

UNITED STATES PATENT OFFICE.

S. NORRIS AND W. KNIGHT, OF PHILADELPHIA, PENNSYLVANIA, ASSIGNORS TO WILLIAM NORRIS.

MANNER OF CONSTRUCTING CARRIAGES OF LOCOMOTIVE STEAM-ENGINES.

Specification of Letters Patent No. 2,951, dated February 10, 1843.

*To all whom it may concern:*

Be it known that we, SEPTIMUS NORRIS and WILLIAM KNIGHT, of the city of Philadelphia, in the State of Pennsylvania, have invented certain new and useful Improvements in the Manner of Constructing Carriages of Locomotive Steam-Engines; and we do hereby declare that the following is a full and exact description thereof.

The main object of our invention is to obtain an equal bearing of the driving wheels of locomotive steam engines upon the rails, notwithstanding any elevation, or depression, of parts of said rails; and this we effect in a manner somewhat resembling that for which a patent was obtained by Joseph Harrison, Jr., and dated the 24th of April, 1838; but by an arrangement of the respective parts that constitute a great improvement thereon, and by which it is particularly adapted to the driving wheels of locomotive engines which are not attached to a truck that turns on a center, but which is similar, in its general mode of action, to that of the independent frame for the driving wheels, for which a patent was obtained by Mr. A. M. Eastwick, dated on the 20th of November, 1837.

In the accompanying drawing, Figure 1, represents a part of the main frame of a locomotive engine, and of an independent frame to which the pedestals of the driving wheels are attached. Fig. 2, is a top view of said independent frame, and of the driving wheels, the main frame having been removed. Fig. 3, is a side view of a shaft which passes through, and connects, the fore ends of the driving wheel frame, and also of a cross bar which connects the sides of the main frame with each other.

A, A, is one of the sides of the main frame of the locomotive, upon which the engine and boiler are to be sustained.

B, B, are the sides of the independent driving wheel frame, to which the pedestals that receive the boxes of the driving wheels are attached.

C, C, are the axles of the driving wheels.

D, D, are the hind pedestals, which are bored through from end to end, at their upper sides, to receive a cylindrical gudgeon formed on the side pieces B, which fits accurately, and turns freely, within the bore of the pedestals.

E, is a shaft that has cylindrical gudgeons at its ends, which gudgeons are fitted into holes F, bored through the pedestals D, and turn therein freely, being confined in place by nuts and washers.

G, is a shaft which crosses the fore end of the driving wheel frame, having gudgeons like those of the shaft E, and which are, in like manner, fitted and confined within the openings H, in the fore end of the frame, D', being one of the pedestals of said frame.

I, is one of the cross bars by which the two side pieces A, A, of the main frame are connected together; the cross bar is placed immediately above the shaft G, of the driving wheel frame; and in its center it has a slot, or mortise, as shown at J, Fig. 4, which is a top view of that part of it.

K, is a bolt that is firmly keyed to the shaft G, and has its upper end flattened, so as to pass through the mortise J, within which it fits loosely, its width being considerably less than the length of said mortise, in order to admit of the requisite play in that direction, occasioned by the vertical motion of the wheels, from inequalities in the roads. A pin, or key, $a$, may be passed through the upper end of the bolt K; this bolt, with the side rods L, constituting the only attachments of the driving wheel frame to the main frame of the locomotive. To save expense in the forging of the side pieces of the frame B, Fig. 1, we intend, sometimes, to use a straight axle with gudgeons at both ends, to enter cavities bored to receive them in each of the pedestals, as shown in Fig. 5; as less fitting will then be required in this case than under the arrangement above described. The axle, $e$, may be prevented from turning by passing a bolt, or key, as at $f$, through it and through the pedestal.

L, is a rod that extends from the fore pedestal D', toward the front end of the main frame, to each of which it is connected by a knuckle joint, thus allowing it to play vertically with the frame of the driving wheels; there is, of course, a similar rod on each side of the locomotive. The truck, which is situated near the fore end of the main frame, is not represented, as it does not differ in any respect from those previously in use; but we intend, sometimes, to construct the frame of this truck upon the same principle, and to connect its parts substantially in the same manner with that in which we construct and arrange the frame of our driving wheels, as above described; and when so constructed, it is, of course, considered by us as constituting a part of our improvement.

In our improved locomotive, we place the center bearing of the frame of the driving wheels considerably in front of the center of the fire box, instead of in a line with that center, as formerly; by which means we throw a larger portion of the weight of the engine upon the driving wheels than upon the former plan. This arrangement also affords the means of increasing the length of the boiler and its tubes without inconvenience, and by which the heat generated in the furnace is rendered more effective. The ordinary length of the tubes in such boilers is about nine feet, and by the within described arrangement we have been able, sometimes, to add two feet, making the whole length about eleven feet.

By placing the independent frame of the driving wheels in front of the fire box, the adhesion of the driving wheels may be greatly increased, and that in proportion to their advanced position. We have sometimes placed them so far in advance as that the front of the fire box should be in a line, or nearly so, with the periphery of the hind driving wheel, thus, of course, throwing a greatly increased weight upon said wheels. We do not, however, make any claim to any particular location of these wheels, which we mean to vary according to circumstances.

The rod, or bolt, M, which extends from the spring N, to the side B, of the driving wheel frame, and which passes through the side piece A, A, of the main frame, must have a sliding motion back and forth, at its lower end; as, without this provision, the side piece B, could not play up and down without cramping; to admit of the requisite play back and forth, we bolt boxes O, on to the side frame, which boxes are flat and smooth on their upper sides, and on these rest the thimbles b, which receive the ends of the bolts M, and these thimbles can slide freely on the top of the box.

When the respective parts of a locomotive carriage are thus combined and arranged, either of the driving wheels will be free to rise, or fall, in obedience to any inequality of the rails, while the whole of said wheels will still have their full bearing thereon; and the axles will stand at right angles with the pedestals. The side rods L, preserve the distance between the driving wheels and the engine unchanged by the rising, or falling, of said wheels, and thus insure the correct action of the engine valves. The driving wheels are to be coupled by means of connecting rods, and crank pins, in the usual way.

Having thus fully described the nature of our improvements in the locomotive steam engine, it is to be understood that we do not claim the principle of constructing a truck frame in such manner as to admit of a vertical play in either, or any, of the wheels, while the others shall retain their full bearing upon the rails, this having been effected in the truck frame which was the subject, in part, of the patent herein referred to as having been granted to Joseph Harrison, Jr. But

What we do claim as constituting our invention, is the improved mode herein described of effecting that object, and, more particularly, as applied to the driving wheels of locomotive steam engines; that is to say, we claim—

The constructing of a frame for the driving wheels, which frame is independent of the main frame of the engine and is formed without the use of diagonal bars, or of a center pin on which it may turn; the said independent frame having the pedestals in which the axles of the four driving wheels run attached to their side pieces, and being otherwise combined with the axles of the driving wheels, as herein set forth; the rear ends of said side pieces also, consisting of long gudgeons which pass through cylindrical cavities in the pedestals of the hind wheels, and the side pieces being connected together by shafts provided with cylindrical gudgeons passing through holes in said side pieces, or in the pedestals attached to them, as herein set forth.

SEPTIMUS NORRIS.
WM. KNIGHT.

Witnesses:
 Thos. G. Potter,
 Philip Rice.